E. T. Miller,
Drag Saw.

Nº 17,512. Patented June 9, 1857.

UNITED STATES PATENT OFFICE.

E. T. MILLER, OF CHELSEA, MASSACHUSETTS.

MACHINE FOR FELLING TREES BY HAND.

Specification of Letters Patent No. 17,512, dated June 9, 1857.

*To all whom it may concern:*

Be it known that I, ELLIOT T. MILLER, of Chelsea, in the county of Suffolk and State of Massachusetts, have invented a new and Improved Device for Cutting Down Standing Trees; and I do hereby declare that the following is a full, clear, and exact description of the same, reference being had to the annexed drawings, making a part of this specification, in which—

Figure 1:
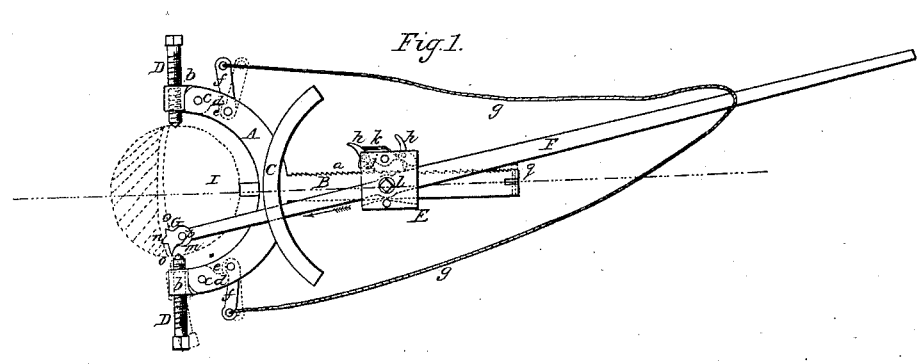
Figure 3:
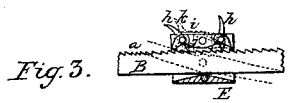
Figure 2:
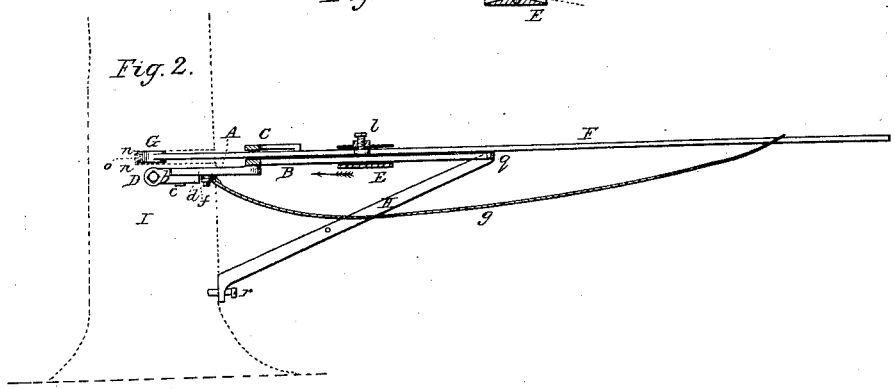

Figure 1 is a plan or top view of my improvement. Fig. 2, is a longitudinal vertical section of my improvement. Fig. 3 is a detached plan or top view of the device by which the cutter is fed to its work.

Similar letters of reference indicate corresponding parts in the several figures.

My invention consists in having a cutter attached to a vibrating bar which is pivoted in a sliding collar placed on a rack bar and provided with pawls. The rack bar being attached to the tree to be felled by means of a clamp peculiarly constructed, the whole being arranged as will be hereinafter fully shown and described, whereby the cutter as the bar is vibrated will be fed automatically to its work, the cutter acting while moving in either direction and performing its work in an expeditious manner.

To enable those skilled in the art to make and use my invention I will proceed to describe its construction and operation.

A represents a curved or segment bar constructed of iron, and having a bar B projecting radially from it at a point equidistant between its ends, said bar B having rack teeth (*a*) cut at one edge, as shown at Figs. 1 and 3. The inner end of the bar B at its junction with the segment bar A has a segment guide C attached to it. The bar B and guide C are both constructed of iron.

To each end of the segment bar A, a nut (*b*) is attached by a pivot (*c*). Through each nut (*b*) a screw D passes, and the inner ends of these nuts have lips (*d*) formed on them, one on each, and these lips bear against shoulders (*e*) on small bars (*f*) which are pivoted to the under side of the segment bar A. The outer end of each bar (*f*) has a rope or chain (*g*) attached.

On the bar B a sliding collar E is placed. This collar is allowed to slide freely on the bar and has two pawls (*h*) (*h*) fitted within it, at one side, said pawls being pivoted to a bar (*i*) which works on a fulcrum pin (*j*), the pin (*j*) passing through the center of the bar (*i*), see Fig. 3. The two pawls (*h*) (*h*) are connected by a spring (*k*) formed of an elastic string or cord, one end of which is attached to the upper end of one pawl, the opposite end of the string being attached to the lower end of the other pawl. The spring (*k*) has a tendency to keep the pawls in gear with the rack teeth in the bar B. Instead however of the elastic string or cord (*k*) a small spring may be employed for each pawl.

F represents a bar which passes through the collar E, said bar being pivoted in said collar at (*l*) the pivot serving as a fulcrum pin.

To the inner end of the bar F a cutter G is attached. This cutter is formed of a stock (*m*) having two lips or cutters (*n*) (*n*) attached to it, one on its upper and the other on its lower edge, a space being allowed between the two as shown clearly in Fig. 2. At each end of the stock (*m*) a chisel-shaped cutter (*o*) is formed. The stock (*m*) is attached to the bar F by a pivot (*p*) and a trifling degree of play is given the stock on said pivot. The bar F passes through the segment guide C.

To the outer end of the bar B a rod H is attached by a pin or bolt (*q*). Through the lower end of said rod a pin or bolt (*r*) passes.

The implement is attached to the tree to be felled by placing the lips (*d*) on the nuts (*b*) against the shoulders (*e*) on the bars (*f*) and then turning the rods D till their inner ends bear firmly against the tree shown in red and designated by I. The lower end of the rod H braces the outer end of the bar B, the lower end of the rod H being secured to the tree by driving the pin (*r*) into it. See Fig. 2. The sliding collar E is then drawn back to the outer end of the bar B, and the bar F is vibrated back and forth by hand, said bar working on the pin (*l*) as a center. At each vibration or stroke of the bar F the bar strikes the ends of the bar (*i*), the ends of the bar being actuated alternately and the two pawls feed the cutter G to its work, the pawls catching alternately into the rack and moving the collar E and bar F forward or in the direction indicated by arrow 1. The cutter acts upon the tree as follows, the two lips (*n*) (*n*) cut horizontally into the tree and determine the width of the cut or kerf, and the chisel formed ends or cutters (*o*) cut out the wood between, and as the stock (*m*) is allowed a slight degree of vibration on the pivot (*p*) the cutters (*o*) will be alternately actuated so as to assume a cutting position in the direction of its cutting stroke or movement, this position being obtained or given the cutting ends (*o*) simply by the movement of the bar F and the bearing of the cutters against the tree I. Thus it will be seen that by simply vibrating the bar F the cutter G will be properly presented to its work, cutting in either direction, and also fed to its work automatically. When the tree is cut through the operator by pulling the rope or chain (*g*), actuates the bars (*f*) and withdraws the shoulders (*e*) from the lips (*d*) on the nuts (*b*) thereby allowing the nuts (*b*) to move outward and causing the implement to be detached from the tree.

I would remark that this implement may be used for cutting felled trees into cord or fire wood, the application of the implement being the same with the exception that the position of the implement is changed so that the bar F is worked vertically instead of horizontally. This position of course is due to the horizontal position of the log.

Having thus described my invention, what I claim as new and desire to secure by Letters Patent, is—

The vibrating bar F with cutter G attached constructed as shown, the bar F being pivoted in the sliding collar E provided with the pawls (*h*) (*h*) and fitted on the rack bar B, which is attached to the tree I by means of the brace H and clamp formed of the screw rods D passing through the nuts (*b*) attached to the segment bar A and retained in proper position by the bars (*f*) substantially as described for the purpose set forth.

E. T. MILLER.

Witnesses:
D. W. GOOCH,
JAMES HUMPHREY.